US009715586B2

(12) United States Patent
Plüss et al.

(10) Patent No.: US 9,715,586 B2
(45) Date of Patent: Jul. 25, 2017

(54) READ/WRITE DEVICE AND TRANSPONDER FOR EXCHANGING DATA VIA AN ELECTROMAGNETIC FIELD

(71) Applicant: LEGIC IDENTSYSTEMS AG, Wetzikon (CH)

(72) Inventors: Peter Plüss, Tann (CH); Marcel Plüss, Tann (CH)

(73) Assignee: LEGIC IDENTSYSTEMS AG (CH)

( * ) Notice: Subject to any disclaimer, the term of this patent is extended or adjusted under 35 U.S.C. 154(b) by 15 days.

(21) Appl. No.: 14/425,542

(22) PCT Filed: Sep. 3, 2013

(86) PCT No.: PCT/EP2013/002635
§ 371 (c)(1),
(2) Date: Mar. 3, 2015

(87) PCT Pub. No.: WO2014/037097
PCT Pub. Date: Mar. 13, 2014

(65) Prior Publication Data
US 2015/0220727 A1  Aug. 6, 2015

(30) Foreign Application Priority Data
Sep. 4, 2012 (CH) ...................................... 1578/12

(51) Int. Cl.
*G06F 21/00* (2013.01)
*G06F 21/44* (2013.01)
(Continued)

(52) U.S. Cl.
CPC .......... *G06F 21/445* (2013.01); *G06F 21/606* (2013.01); *G06K 7/0008* (2013.01); *G06K 7/10227* (2013.01)

(58) Field of Classification Search
USPC ......................................................... 726/30
See application file for complete search history.

(56) References Cited

U.S. PATENT DOCUMENTS

| 7,367,049 B1 * | 4/2008 | Robinson | ............... G06Q 20/04 |
| | | | 713/186 |
| 8,740,066 B2 | 6/2014 | Klosa | ............................ 235/380 |

(Continued)

FOREIGN PATENT DOCUMENTS

| CN | 1754178 A | 3/2006 |
| CN | 102105885 A | 6/2011 |
| EP | 1 598 771 A1 | 11/2005 |

OTHER PUBLICATIONS

International Search Report dated Nov. 26, 2013 issued in corresponding International patent application No. PCT/EP2013/002635.
(Continued)

*Primary Examiner* — Jason Lee
(74) *Attorney, Agent, or Firm* — Ostrolenk Faber LLP

(57) ABSTRACT

For controlling access rights between a read/write device (1) and a transponder module (2) configured to exchange data via an electromagnetic field (3), the read/write device (1) obtains via the electromagnetic field (3) from the transponder module (2) a technology release code (T) which indicates a version of technology of the transponder module (2). Subsequently, the read/write device (1) sets access rights for the transponder module (2) using the technology release code (T). Setting access rights based on a technology release code (T) obtained from a transponder module (2) makes it possible to block transponder modules (2) selectively, depending on their inherent technology release, so that transponder modules (2) with a technology release that is without a security breach may remain in operation whereas transponder modules (2) with a technology release having a compromised security can be blocked from access.

27 Claims, 6 Drawing Sheets

(51) Int. Cl.
*G06K 7/00* (2006.01)
*G06K 7/10* (2006.01)
*G06F 21/60* (2013.01)

(56) References Cited

U.S. PATENT DOCUMENTS

2006/0145818 A1* 7/2006 Kusakabe ............ G06K 7/0008
340/10.4
2006/0181395 A1* 8/2006 Gruszynski ........ G06K 7/10217
340/10.51
2012/0159105 A1 6/2012 von Behren et al.

OTHER PUBLICATIONS

Written Opinion dated Nov. 26, 2013 issued in corresponding International patent application No. PCT/EP2013/002635.
Chinese Office Action dated Jul. 4, 2106 issued in Chinese Patent Application No. 201380042792.2 with an English Language Translation of the Relevant Portions.

* cited by examiner

READ/WRITE DEVICE AND TRANSPONDER FOR EXCHANGING DATA VIA AN ELECTROMAGNETIC FIELD

FIELD OF THE INVENTION

The present invention relates to a read/write device and a transponder module for exchanging data via an electromagnetic field and to a method of controlling access rights between the read/write device and the transponder module.

BACKGROUND OF THE INVENTION

Readers or read/write devices and transponder modules for exchanging data via an electromagnetic field are widely used in applications such as access control, stand-alone locks, cashless payment, accounting of printing & copying costs, or campus solutions. Typically, the transponder modules are portable, mobile devices which are implemented as passive contactless data storage devices, such as smart cards or identification tags, or as active communication devices, such as mobile telephones with near field communication (NFC) functions. The readers or read/write devices are configured to read and/or write data to and/or from the transponder module via an electromagnetic field. Particularly, for person or product identification applications, radio frequency identification (RFID) systems are widely used. In RFID systems, contactless communication between the transponder module and the reader or read/write device is based on inductive coupling of an RF field, i.e. an electromagnetic field which is transmitted by an antenna of the reader or read/write device, and an inductive element, typically a coil integrated into the transponder module. Inductive coupling is possible as long as the transponder module is within the communication range of the antenna of the reader or read/write device and inductive coupling occurs as soon as the RF field is activated. The reader and/or read/write device activates the RF field periodically, e.g. every 250 milliseconds. When the electromagnetic field is switched on, a carrier wave is emitted which includes a modulated identification/authentication signal with duration of a few milliseconds. An identification/authentication response signal from the transponder module is evaluated in order to detect, identify, and/or authenticate the transponder module, such that, for example, a room may be accessed, a payment may be performed, printing & copying costs may be assigned to an account, or a book of a library in a campus may be lent out.

As outlined above, the contactless exchange of data between a reader or read/write device and transponder modules is used in various applications where the level of security and confidentiality is critical. Accordingly, it is important that the reader or read/write device and transponder module are configured with cryptographic algorithms for mutual authentication. Nevertheless, while the manufacturers of the readers or read/write devices and transponder modules are continuously improving the reliability and security of these authentication algorithms, there are persistent attempts in breaking fraudulently these algorithms to gain unauthorized access to data, services, or restricted areas, for example. To stay ahead of such fraudulent attacks, some providers introduce new algorithms and change the transponder modules on a periodic basis, regardless of whether or not the security has been breached. In scenarios where millions of transponder modules are involved, this is a very costly and inefficient approach.

SUMMARY OF THE INVENTION

It is an object of this invention to provide a read/write device, a transponder module and a method of controlling access rights between the read/write device and the transponder module, which read/write device, transponder module and method do not have at least some of the disadvantages of the prior art.

According to the present invention, these objects are achieved through the features of the independent claims. In addition, further advantageous embodiments follow from the dependent claims and the description.

According to the present invention, the above-mentioned objects are particularly achieved in that a read/write device for exchanging data via an electromagnetic field with a transponder module, comprises a security module configured to obtain from the transponder module via the electromagnetic field a technology release code which indicates a version of technology of the transponder module, and to set access rights for the transponder module using the technology release code. For example, the technology release code indicates a type of a chip of the transponder module, a version number of the chip of the transponder module, a release number of an encryption algorithm implemented on the transponder module, and/or a version number of a communication protocol implemented on the transponder for exchanging data via the electromagnetic field with the read/write device. Setting access rights based on a technology release code obtained from a transponder module has the advantage that transponder modules can be blocked selectively, for example, depending on their inherent technology release, so that transponders with a technology release which is without a security breach may remain in operation whereas transponders with a technology release having compromised security can be blocked, e.g. by denying access and/or disabling functions.

In an embodiment, the security module is configured to exchange with the transponder module mutual authentication messages, to determine identification information associated with the transponder module using at least one of the mutual authentication messages received from the transponder module, and to obtain the technology release code from the identification information associated with the transponder module.

In another embodiment, the security module is configured to generate and transmit to the transponder module a read request, to receive from the transponder module a read response, to determine unencrypted identification information associated with the transponder module using encrypted or non-encrypted identification information included in the read response, and to obtain the technology release code from the unencrypted identification information associated with the transponder module.

In a further embodiment, the security module is configured to obtain from the transponder module via the electromagnetic field a technology release code included in an application specific data segment stored on the transponder module, and to determine access rights for the application specific data segment using the technology release code included in the application specific data segment. For example, the application-specific data segments are generated using a hierarchical authentication scheme whereby each application-specific data segment inherits application-specific identification information from an authorized entity having a higher authorization level. Thus, access rights for application specific data segments can be controlled on an individual basis, depending on whether the entity that generated and/or updated the respective application-specific data segment used a blocked (version of) technology.

In an embodiment, the security module is configured to obtain from the transponder module via the electromagnetic field an initializer code which indicates an initializing entity, which initializing entity initialized the transponder module by storing identification information in the transponder module, and to set access rights for the transponder module using the initializer code. Setting access rights based on an initializer code obtained from a transponder module has the advantage that transponder modules can be blocked selectively, for example, after an initializer was compromised by a security breach.

In a further embodiment, the security module is configured to obtain from the transponder module via the electromagnetic field an initializer code included in an application specific data segment stored on the transponder module, and to determine access rights for the application specific data segment using the initializer code included in the application specific data segment.

In addition to the read/write device, the present invention also relates to a transponder module for exchanging data via an electromagnetic field with the read/write device, whereby the transponder module comprises a data store having stored therein a technology release code which indicates a version of technology of the transponder module, the technology release code being obtainable for the read/write device via the electromagnetic field for setting in the read/write device access rights for the transponder module using the technology release code.

In an embodiment, the data store of the transponder module has further stored therein an initializer code which indicates an initializing entity, which initializing entity initialized the transponder module, the initializer code being obtainable for the read/write device via the electromagnetic field for setting in the read/write device access rights for the transponder module using the initializer code.

In a further embodiment, the data store of the transponder module has further stored therein one or more application specific data segments, each of the application specific data segments including identification information with a technology release code or an initializer code, the technology release code and the initializer code being obtainable for the read/write device via the electromagnetic field for setting in the read/write device access rights for accessing an application specific data segment of the transponder module.

In addition to the read/write device and the transponder module, the present invention also relates to a method of controlling access rights between the read/write device and the transponder module, whereby the method comprises obtaining by the read/write device via the electromagnetic field from the transponder module a technology release code which indicates a version of technology of the transponder module, and setting by the read/write device access rights for the transponder module using the technology release code.

In an embodiment, the method further comprises exchanging between the read/write device and the transponder module mutual authentication messages, determining by the read/write device identification information associated with the transponder module using at least one of the mutual authentication messages received from the transponder module, and obtaining by the read/write device the technology release code from the identification information associated with the transponder module.

In another embodiment, the method comprises transmitting from the read/write device to the transponder module a read request, receiving in the read/write device from the transponder module a read response, determining by the read/write device unencrypted identification information associated with the transponder module using encrypted or non-encrypted identification information included in the read response, and obtaining by the read/write device the technology release code from the unencrypted identification information associated with the transponder module.

In further embodiment, the method comprises determining by the read/write device from the technology release code a type of a chip of the transponder module, a version number of the chip of the transponder module, a release number of an encryption algorithm implemented on the transponder module, and/or a version number of a communication protocol implemented on the transponder for exchanging data via the electromagnetic field with the read/write device.

In an embodiment, the method comprises obtaining by the read/write device via the electromagnetic field from the transponder module a technology release code included in an application specific data segment stored on the transponder module, and determining by the read/write device access rights for the application specific data segment using the technology release code included in the application specific data segment.

In another embodiment, the method comprises obtaining by the read/write device via the electromagnetic field from the transponder module an initializer code, which initializer code indicates an initializing entity, which initializing entity initialized the transponder module by storing identification information in the transponder module, and setting by the read/write device access rights for the transponder module using the initializer code.

In further embodiment, the method comprises obtaining by the read/write device via the electromagnetic field from the transponder module an initializer code included in an application specific data segment stored on the transponder module, and determining by the read/write device access rights for the application specific data segment using the initializer code included in the application specific data segment.

In a further aspect of the invention, the above-mentioned objects are particularly achieved in that a transponder module for exchanging data via an electromagnetic field with a read/write device, comprises a security module configured to obtain from the read/write device via the electromagnetic field a technology release code which indicates a version of technology of the read/write device, and to set access rights for the read/write device using the technology release code of the read/write device. For example, the technology release code indicates a type of a chip of the read/write device, a version number of the chip of the read/write device, a release number of an encryption algorithm implemented on the read/write device, and/or a version number of a communication protocol implemented on the read/write device for exchanging data via the electromagnetic field with the transponder module. Setting access rights based on a technology release code obtained from a read/write device has the advantage that read/write devices can be blocked selectively, for example, depending on their inherent technology release, so that read/write devices with a technology release which is without a security breach may remain in operation whereas read/write devices with a technology release having compromised security can be blocked, e.g. by denying access and/or disabling functions.

In an embodiment, the security module of the transponder module is configured to exchange with the read/write device mutual authentication messages, and to determine the technology release code of the read/write device using at least one of the mutual authentication messages received from the read/write device.

In another embodiment, the security module of the transponder module is configured to generate and transmit to the read/write device a read request, to receive from the read/write device a read response, and to determine the technology release code of the read/write device from the read response.

In a further embodiment, the security module of the transponder module is configured to determine a technology release code included in an application specific data segment stored on the transponder module, and to determine access rights for the application specific data segment using the technology release code included in the application specific data segment. For example, the application-specific data segments are generated using a hierarchical authentication scheme whereby each application-specific data segment inherits application-specific identification information from an authorized entity having a higher authorization level. Thus, access rights for application specific data segments can be controlled on an individual basis, depending on whether the entity that generated and/or updated the respective application-specific data segment used a blocked (version of) technology.

In an embodiment, the security module of the transponder module is configured to obtain from the read/write device via the electromagnetic field an initializer code which indicates an initializing entity, which initializing entity initialized the read/write device, and to set access rights for the read/write device using the initializer code. Setting access rights based on an initializer code obtained from a read/write device has the advantage that read/write devices can be blocked selectively, for example, after an initializer was compromised by a security breach.

In a further embodiment, the security module of the transponder module is configured to obtain from the transponder module an initializer code included in an application specific data segment stored on the transponder module, and to determine access rights for the application specific data segment using the initializer code included in the application specific data segment.

In addition to the transponder module according to the further aspect, the present invention also relates to a method of controlling access rights between a read/write device and a transponder module configured to exchange data via an electromagnetic field, whereby the method comprises obtaining by the transponder module via the electromagnetic field from the read/write device a technology release code which indicates a version of technology of the read/write device, and setting by transponder module access rights for the read/write device using the technology release code of the read/write device.

In an embodiment, the method further comprises exchanging between the read/write device and the transponder module mutual authentication messages, and determining by the transponder module the technology release code of the read/write device using at least one of the mutual authentication messages received from read/write device.

In another embodiment, the method comprises transmitting from the transponder module to the read/write device a read request, receiving in the transponder module from the read/write device a read response, and determining by the transponder module the technology release code of the read/write device from the read response.

In further embodiment, the method comprises determining by the transponder module from the technology release code a type of a chip of the read/write device, a version number of the chip of the read/write device, a release number of an encryption algorithm implemented on the read/write device, and/or a version number of a communication protocol implemented on the read/write device for exchanging data via the electromagnetic field with transponder module.

In an embodiment, the method comprises obtaining by the transponder module a technology release code included in an application specific data segment stored on the transponder module, and determining by transponder module access rights for the application specific data segment using the technology release code included in the application specific data segment.

In another embodiment, the method comprises obtaining by the transponder module via the electromagnetic field from the read/write device an initializer code, which initializer code indicates an initializing entity, which initializing entity initialized the read/write device, and setting by the transponder module access rights for the read/write device using the initializer code.

In further embodiment, the method comprises obtaining by the transponder module an initializer code included in an application specific data segment stored on the transponder module, and determining by the transponder module access rights for the application specific data segment using the initializer code included in the application specific data segment.

In addition to the transponder module and the method of controlling access rights between the transponder module and a read/write device according to the further aspect, the present invention also relates to a read/write device for exchanging data via an electromagnetic field with the transponder module, whereby the read/write device comprises a data store having stored therein a technology release code which indicates a version of technology of the read/write device, the technology release code being obtainable for the transponder module via the electromagnetic field for setting in the transponder module access rights for read/write device using the technology release code of the read/write device.

In an embodiment, the data store has further stored therein an initializer code which indicates an initializing entity, which initializing entity initialized the read/write device, the initializer code being obtainable for the transponder module via the electromagnetic field for setting in the transponder module access rights for read/write device using the initializer code.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
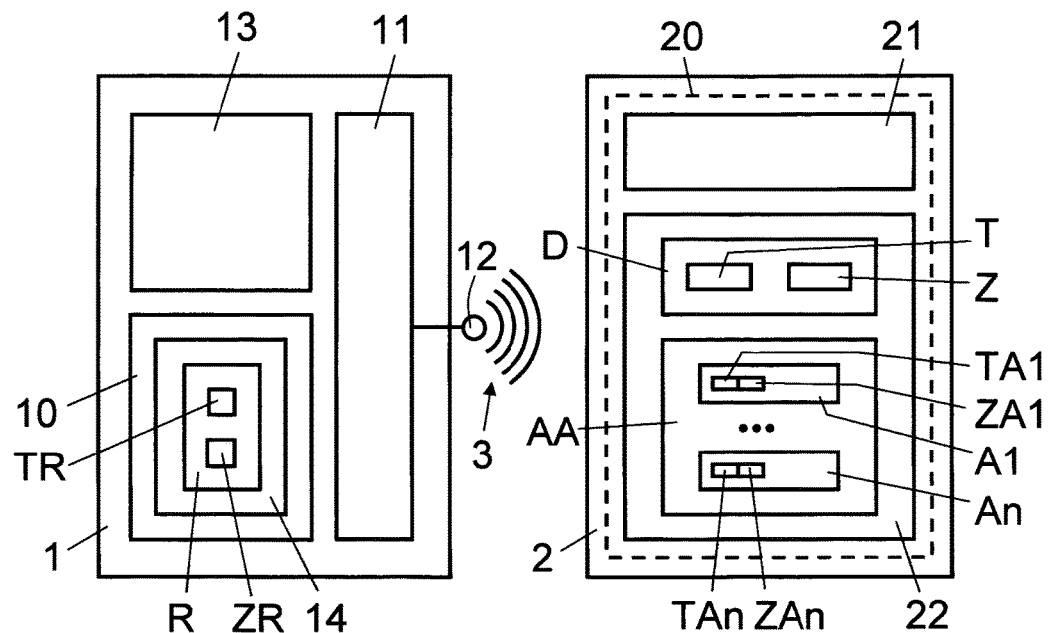
FIG. 1: shows a block diagram illustrating schematically a read/write device exchanging data via an electromagnetic field with a transponder module.

In FIGS. 1, 2, 8 and 9, reference numeral 1 refers to a reader or a read/write device comprising a communication module 11 connected to an antenna 12 and configured to exchange data with a transponder module 2 via an electromagnetic field 3. For example, the communication module 11 is configured to exchange data with the transponder module 2 according to a standardized RFID (Radio Frequency Identification) protocol as defined in standards such as ISO 18092, ISO 1800, ISO 15693, or ISO 14443, or according to a proprietary data transmission or RFID protocol.

Figure 2:
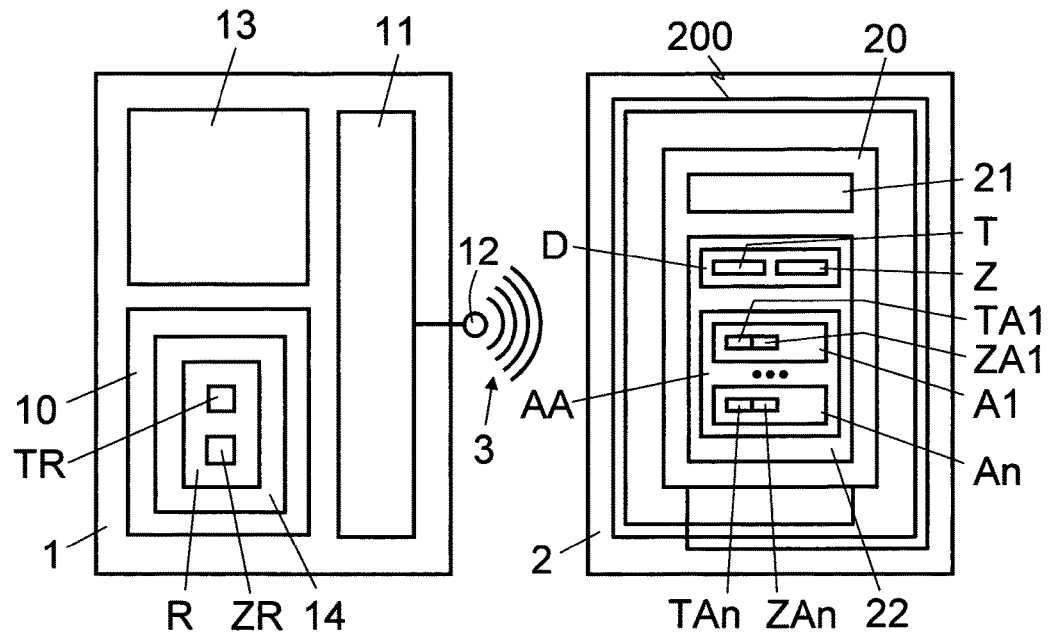
FIG. 2: shows a block diagram illustrating schematically the read/write device exchanging data via an electromagnetic field with a transponder module implemented as an RFID transponder.

As illustrated in FIGS. 1 and 2, the read/write device 1 further comprises a security module 10 which will be described later with reference to FIGS. 3, 4, 5, 6, and 7. Preferably, the security module 10 is implemented as a programmed software module comprising computer code to control one or more processors 13 of the read/write device 1. The computer code is stored on a computer-readable medium which is connected in a fixed or removable fashion with the one or more processors 13 of the read/write device 1. In alternative embodiments, the security module 10 is implemented partly or fully by way of hardware components.

As illustrated in FIGS. 1, 2, 8 and 9, the transponder module 2 is a device which comprises a computing unit 20 that includes a processing unit 21 and a data store 22. The transponder module 2 is a mobile portable device which is implemented as an active transponder, for example a mobile radio telephone, e.g. a GSM (Global System for Mobile Communication) or UMTS (Universal Mobile Telephone System) or another mobile cellular telephone with near field communication (NFC) functions, or the transponder module 2 is implemented as a passive RFID transponder having an antenna coil 200 connected to the computing unit 20, as illustrated schematically in FIG. 2.

As illustrated schematically in FIGS. 1 and 2, stored in the data store 22 is identification information D associated with the transponder module 2. The identification information D comprises a technology release code T and/or an initializer code Z. Depending on the embodiment, the identification information D, and thus the technology release code T and/or the initializer code Z, is stored in encrypted or non-encrypted form in the data store 22 of the transponder module 2.

The technology release code T is an alphanumerical or binary code which indicates and identifies a particular version of technology of the transponder module 2. Specifically, the technology release code T indicates and identifies a particular technology release having specific characteristics such as the actual type of the chip implemented on the transponder module 2, the actual version number of the chip of the transponder module 2, the release or version number of the encryption algorithm implemented on the transponder module 2, and/or the release or version number of the communication protocol implemented on the transponder module 2 for exchanging data via the electromagnetic field 3 with the read/write device 1. In an embodiment, the type of the chip implemented on the transponder module 2 includes the manufacturer of the chip. The technology release code T is stored in the data store 22 of the transponder module 2 by the manufacturer or initializer of the transponder module 2. Depending on the embodiment, the technology release code T is used as an index for looking up in a table, list, or database the specific characteristics of the respective technology release, or the technology release code T is structured and comprises several code segments, each code segment defining a specific characteristics of the respective technology release.

The initializer code Z is an alphanumerical or binary code which indicates and identifies the initializing entity, e.g. a manufacturing or service provider firm, which actually initialized the transponder module 2 by storing the identification information D in the transponder module 2.

As illustrated schematically in FIGS. 1, 2, 8 and 9, the data store 22 of the transponder module 2 further comprises an application area AA comprising one or more, typically a plurality of more than ten, application-specific data segments A1, . . . , An. The application-specific data segments A1, . . . , An are generated following a hierarchical authentication scheme whereby each application-specific data segment A1, . . . , An inherits application-specific identification information from an authorized entity having a higher authorization level, e.g. a read/write device 1 or a transponder module 2 configured as a master token. The application-specific identification information of an application-specific data segment A1, . . . , An includes the technology release code TA1, TAn and/or the initializer code ZA1, ZAn inherited from the higher level entity that generated and/or updated the respective application-specific data segment A1, . . . , An.

As illustrated schematically in FIGS. 1 and 2, the read/write device 1 further comprises a data store 14 for storing restrictions R. The restrictions R are stored in a so called black list, which includes restricted technology release codes TR and/or restricted initializer codes ZR. A restricted technology release code TR or a restricted initializer code ZR identifies a specific banned or blocked technology release or a specific banned or blocked initializer, respectively, for which any rights of performing any functions or accessing data have been disallowed or cancelled and are, thus, prohibited. Accordingly, the restrictions R indicate one or more blocked or banned technology release or initializer of a transponder module 2. One skilled in the art will understand that, as an alternative or in addition, the data store 14 may include a so called white list having stored therein technology release codes and/or initializer codes of authorized or allowed technology releases or initializers, respectively.

In the following paragraphs, described with reference to FIGS. 3, 4, 5, 6, and 7 are possible sequences of steps performed by the read/write device 1 and the transponder module 2, respectively, to control authorization of access rights between the read/write device 1 and the transponder module 2. Depending on the embodiment, application and/or configuration, the access rights are directed to a complete logical hierarchy, e.g. the complete set of application-specific data segments A1, . . . , An generated under a hierarchical authentication scheme associated with a root or master authentication entity, or to one or more subsets of the logical hierarchy, e.g. to application-specific data segments A1, . . . , An generated under a specific branch and/or level of the hierarchical authentication scheme. Depending on the embodiment, application and/or configuration, the access rights define whether or not there is a right to access the respective data segments (Yes/No), read and write access (Read/Write), read only access (Read), write only access (Write), read once access with subsequent deletion of the data segment(s) (Read Once), write once access (Write Once), conditional access requiring the access rights of a second party (Conditional), and/or segmented access defining different access rights for different parts of the data segment(s) (Segmented). Although, the following description refers to the read/write device and the transponder module as indicated in FIG. 1 by reference numeral 1 or 2, respectively, the roles could be exchanged in an alternative scenario where a mobile communication device acts as read/write device and a read/write apparatus acts as transponder module, for example. In other words, in the alternative scenario, the read/write device 1 is implemented as a mobile portable device, for example a mobile radio telephone or an RFID transponder, whereas the transponder module 2 is implemented as a reader or a read/write device configured to exchange data via an electromagnetic field 3, e.g. according to a standardized RFID protocol.

As shown in FIGS. 3, 4, 5, 6, and 7, in step S0, restrictions are set in the read/write device 1. Specifically, for each technology release of a transponder module 2 which is to be banned, blocked or black-listed, and for each initializer of a transponder module 2 which is to be banned, blocked or black-listed, the respective technology release code TA1, TAn or initializer code ZA1, ZAn is stored in the section or table of restrictions R in data store 14 by an authorized entity. Preferably, the restrictions R are transmitted to the read/write device 1 via a telecommunications network by means of cryptographic algorithms ensuring authenticity of the respective authorized entity and integrity of the restriction data.

Figure 3:
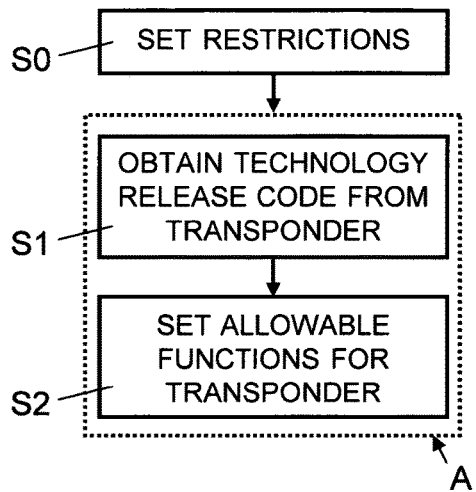
FIG. 3: shows a flow diagram illustrating an exemplary sequence of steps for setting in the read/write device access rights for the transponder module using a technology release code obtained from the transponder module.
Figure 5:
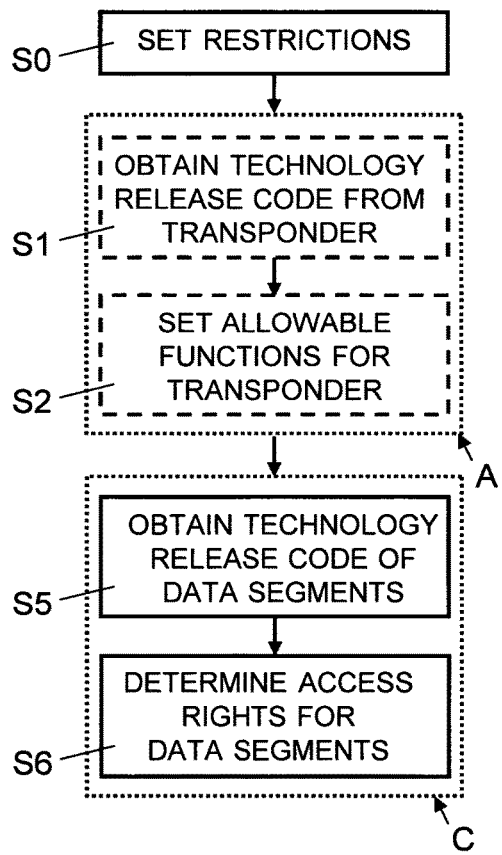
FIG. 5: shows a flow diagram illustrating an exemplary sequence of steps for determining in the read/write device access rights for data segments of the transponder module using a technology release code obtained from the transponder module.
Figure 7:
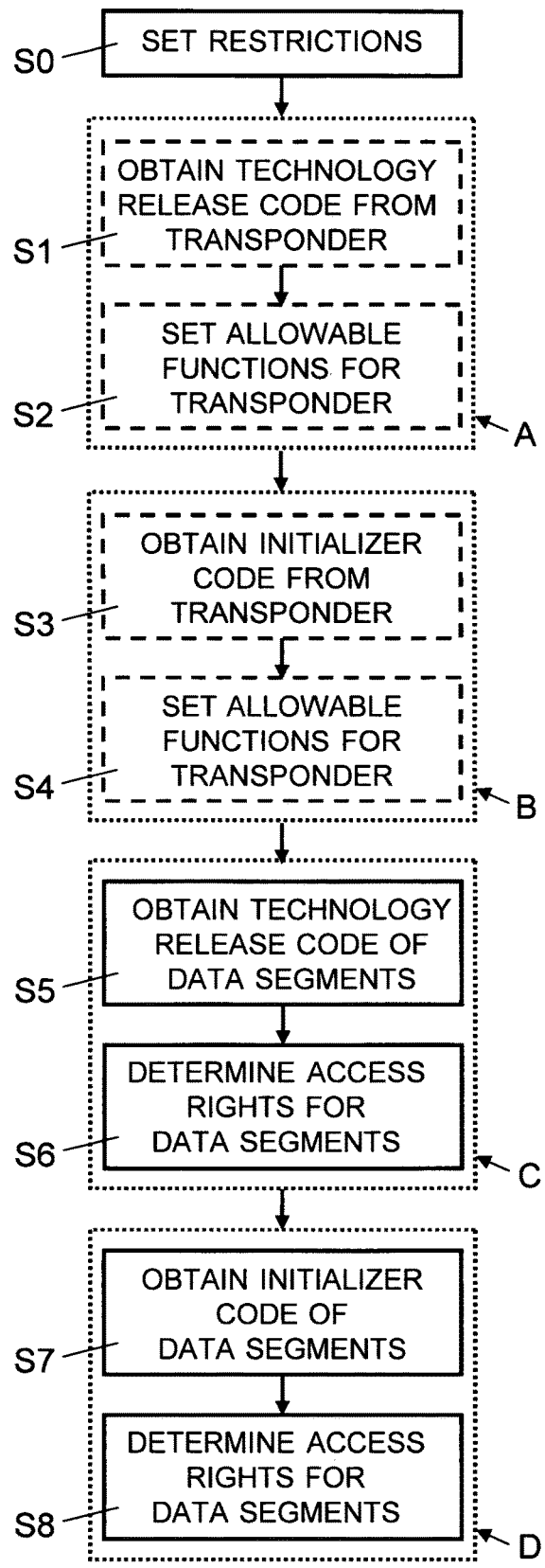
FIG. 7: shows a flow diagram illustrating an exemplary sequence of steps for setting in the read/write device access rights for data segments of the transponder module using a technology release code and an initializer code obtained from the transponder module.

As illustrated in FIGS. 3, 5, and 7, in step S1, the security module 10 of the read/write device 1 obtains the technology release code T from the transponder module 2 via the electromagnetic field 3. In an embodiment, the security module 10 exchanges mutual cryptographic authentication messages with the transponder module 2 and determines the technology release code T from at least one of the mutual authentication messages received from the transponder module 2. For example, the security module 10 transmits to the transponder module 2 a random challenge number. Responsive to the challenge request, the processing unit 21 of the transponder module 2 generates and transmits to the read/write device 1 a cryptographic challenge response, using the technology release code T or identification information D of the transponder module 2 and the random challenge number received from the read/write device 1. Subsequently, the security module 10 determines the unencrypted technology release code T associated with the transponder module 2 by decrypting the challenge response received from the transponder module 2 using the random challenge number. For example, in the ISO 9798 authentication protocol, the technology release code T or identification information D of the transponder module 2 is included in a reserved text field of the response message. Alternatively, the security module 10 transmits to the transponder module 2 a read request, requesting explicitly from the transponder module 2 the technology release code T or identification information D, respectively. Preferably, the read request is transmitted to the transponder module 2 after positive authentication, i.e. after the exchange of cryptographic authentication messages confirming authenticity of the security module 10 and/or the transponder module 2, respectively. Responsive to the read request, the processing unit 21 of the transponder module 2 transmits to the read/write device 1 the technology release code T or identification information D of the transponder module 2, respectively. Depending on the embodiment or implementation, the technology release code T or identification information D is received at the read/write device 1 in encrypted or non-encrypted form. Subsequently, the security module 10 determines the unencrypted technology release code T associated with the transponder module 2 from the response received from the transponder module 2.

As illustrated in FIGS. 3 and 7, in step S2, the security module 10 of the read/write device 1 determines and sets access rights for the transponder module 2, depending on the technology release code T obtained from the transponder module 2. Specifically, the security module 10 checks whether the technology release code T, obtained from the transponder module 2 in step S1, corresponds to a banned or blocked technology release by comparing the technology release code T, obtained from the transponder module 2, to restricted technology release codes TR, stored as restrictions R in data store 14. If there is a match, i.e. if the technology release code T obtained from the transponder module 2 is banned or blocked, the transponder module 2 is considered banned or blocked and no further data exchange with the transponder module 2 is allowed, i.e. no functions and further interactions are allowed for the transponder module 2. In a variant, the allowed functions or interactions are limited to a defined subset for the transponder module 2. For example, the security module 10 determines and sets the access rights for the transponder module 2 depending on the type of the chip implemented on the transponder module 2, the version number of the chip of the transponder module 2, the release or version number of the encryption algorithm implemented on the transponder module 2, and/or the version number of the communication protocol implemented on the transponder module 2 for exchanging data via the electromagnetic field 3 with the read/write device 1, as defined by the technology release code T obtained from the transponder module 2.

Figure 4:
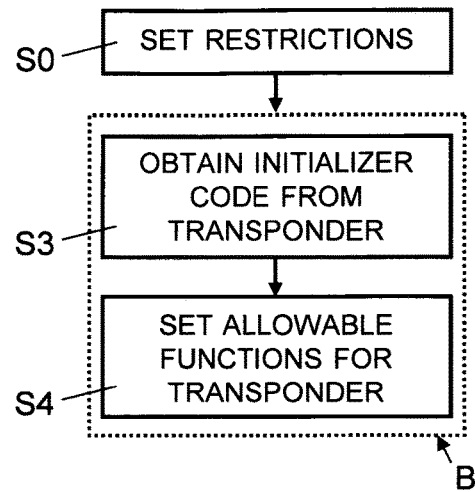
FIG. 4: shows a flow diagram illustrating an exemplary sequence of steps for setting in the read/write device access rights for the transponder module using an initializer code obtained from the transponder module.
Figure 6:
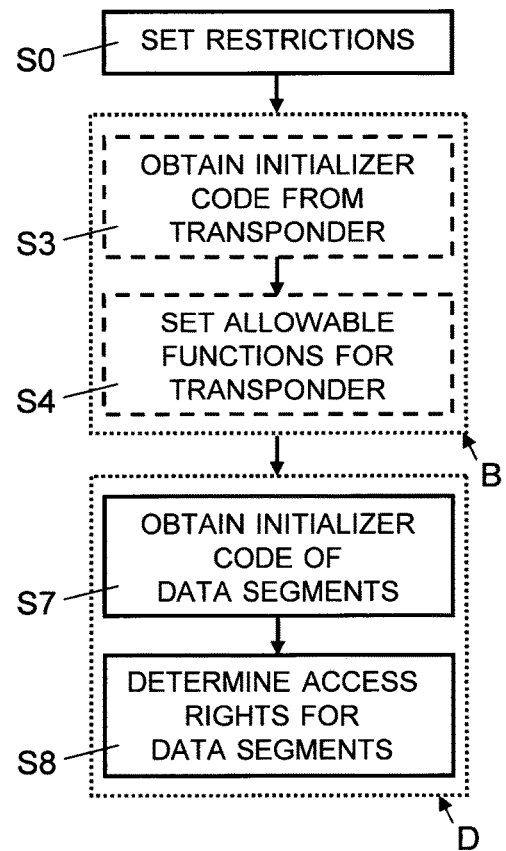
FIG. 6: shows a flow diagram illustrating an exemplary sequence of steps for setting in the read/write device access rights for data segments of the transponder module using an initializer code obtained from the transponder module.

As illustrated in FIGS. 4, 6, and 7, in step S3, the security module 10 of the read/write device 1 obtains the initializer code Z from the transponder module 2 via the electromagnetic field 3. In a preferred embodiment, the security module 10 exchanges mutual cryptographic authentication messages with the transponder module 2 and determines the initializer code Z from at least one of the mutual authentication messages received from the transponder module 2. For example, the security module 10 transmits to the transponder module 2 a random challenge number. Responsive to the challenge request, the processing unit 21 of the transponder module 2 generates and transmits to the read/write device 1 a cryptographic challenge response, using the initializer code Z or the identification information D of the transponder module 2 and the random challenge number received from the read/write device 1. Subsequently, the security module 10 determines the unencrypted initializer code Z associated with the transponder module 2 by decrypting the challenge response received from the transponder module 2 using the random challenge number. Alternatively, the security module 10 transmits to the transponder module 2 a read request, requesting explicitly from the transponder module 2 the initializer code Z or identification information D, respectively. Responsive to the read request, the processing unit 21 of the transponder module 2 transmits to the read/write device 1 the initializer code Z or identification information D of the transponder module 2, respectively. Depending on the embodiment or implementation, the initializer code Z or identification information D is received at the read/write device 1 in encrypted or non-encrypted form. Subsequently, the security module 10 determines the unencrypted the initializer code Z associated with the transponder module 2 from the response received from transponder module 2.

As illustrated in FIGS. 4 and 7, in step S4, the security module 10 of the read/write device 1 determines and sets access rights for the transponder module 2, depending on the initializer code Z obtained from the transponder module 2. Specifically, the security module 10 checks whether the initializer code Z obtained from the transponder module 2 in step S3, corresponds to a banned or blocked initializer by comparing the initializer code Z obtained from the transponder module 2 to restricted initializer codes ZR stored as restrictions R in data store 14. If there is a match, i.e. if the initializer code Z obtained from the transponder module 2 is banned or blocked, the transponder module 2 is considered banned or blocked and no further data exchange with the transponder module 2 is allowed, i.e. no functions and further interactions are allowed for the transponder module 2; in a variant, the allowed functions or interactions are limited to a defined subset for the transponder module 2.

In the embodiment illustrated in FIG. 5, the security module 10 of the read/write device 1 executes step S5 subsequently to steps S1 and S2 of block A, e.g. if the transponder module 2 was not determined to be banned or blocked, or steps S1 and S2 of block A are skipped as optional steps. In step S5, the security module 10 of the read/write device 1 obtains from the transponder module 2 via the electromagnetic field 3 the technology release codes TA1, . . . , TAn included in each case in an application specific data segment A1, . . . , An stored in the application area AA of the transponder module 2. As outlined above with reference to FIGS. 1 and 2, the technology release code TA1, . . . , TAn is included in the application-specific identification information of the respective application-specific data segment A1, . . . , An which is inherited from a higher level entity that generated and/or updated the respective application-specific data segment A1, . . . , An.

In step S6, the security module 10 of the read/write device 1 determines the access rights for the application specific data segments A1, . . . , An based on the technology release code TA1, . . . , TAn included in the respective application specific data segment A1, . . . , An. Specifically, the security module 10 checks whether the technology release code TA1, . . . , TAn obtained from a specific data segment A1, . . . , An in step S5, corresponds to a banned or blocked technology release by comparing the technology release code TA1, . . . , TAn obtained from the transponder module 2 to restricted technology release codes TR stored as restrictions R in data store 14. Therefore, it is possible for the security module 10 to restrict access rights for application specific data segments A1, . . . , An on an individual basis, depending on whether the entity that generated and/or updated the respective application-specific data segment A1, . . . , An used a banned or blocked technology release corresponding to a restricted technology release code TR. For example, the security module 10 cancels or prohibits read and/or write access to any application-specific data segment A1, . . . , An that includes a technology release code TA1, . . . , TAn corresponding to a restricted technology release code TR.

In the embodiment illustrated in FIG. 6, the security module 10 of the read/write device 1 executes step S7 subsequently to steps S3 and S4 of block B, e.g. if the transponder module 2 was not determined to be banned or blocked, or steps S3 and S4 of block A are skipped as optional steps. In step S7, the security module 10 of the read/write device 1 obtains from the transponder module 2 via the electromagnetic field 3 the initializer codes ZA1, . . . , ZAn included in each case in an application specific data segment A1, . . . , An stored in the application area AA of the transponder module 2. As outlined above with reference to FIGS. 3 and 4, the initializer code ZA1, . . . , ZAn is included in the application-specific identification information of the respective application-specific data segment A1, . . . , An which is inherited from a higher level entity that generated and/or updated the respective application-specific data segment A1, . . . , An.

In step S8, the security module 10 of the read/write device 1 determines the access rights for the application specific data segments A1, . . . , An based on the initializer code ZA1, . . . , ZAn included in the respective application specific data segment A1, . . . , An. Specifically, the security module 10 checks whether the initializer code ZA1, . . . , ZAn obtained from a specific data segment A1, . . . , An in step S7, corresponds to a banned or blocked initializer by comparing the initializer code ZA1, . . . , ZAn obtained from the transponder module 2 to restricted initializer codes ZR stored as restrictions R in data store 14. Therefore, it is possible for the security module 10 to restrict access rights for application specific data segments A1, . . . , An on an individual basis, depending on whether the entity that generated and/or updated the respective application-specific data segment A1, . . . , An was initialized by a banned or blocked initializer corresponding to a restricted initializer code ZR. For example, the security module 10 cancels or prohibits read and/or write access to any application-specific data segment A1, . . . , An that includes an initializer code ZA1, . . . , ZAn corresponding to a restricted initializer code ZR.

By checking the technology release codes TA1, . . . , TAn and/or the initializer codes ZA1, . . . , ZAn included in the application specific data segments A1, . . . , An of the transponder module 2, it is possible to block some application-specific data segments A1, . . . , An on a particular transponder module 2 while keeping other application-specific data segments A1, . . . , An unblocked and fully accessible. Thus, depending on the access rights implemented, application-specific data segments A1, . . . , An generated under one or more specific branches and/or levels of a hierarchical authentication scheme are blocked completely and/or limited to read only access, write only access, read once access, write once access, conditional access, and/or segmented access, as outlined above.

As illustrated in FIG. 7, in various embodiments, block C, including steps S5 and S6, is executed in combination with block D, including steps S7 and S8, subsequently to executing block A, including steps S1 and S2, and/or block B, including steps S3 and S4, e.g. if the transponder module 2 was not determined to be banned or blocked, or block A and/or block B are skipped as optional steps.

Figure 8:
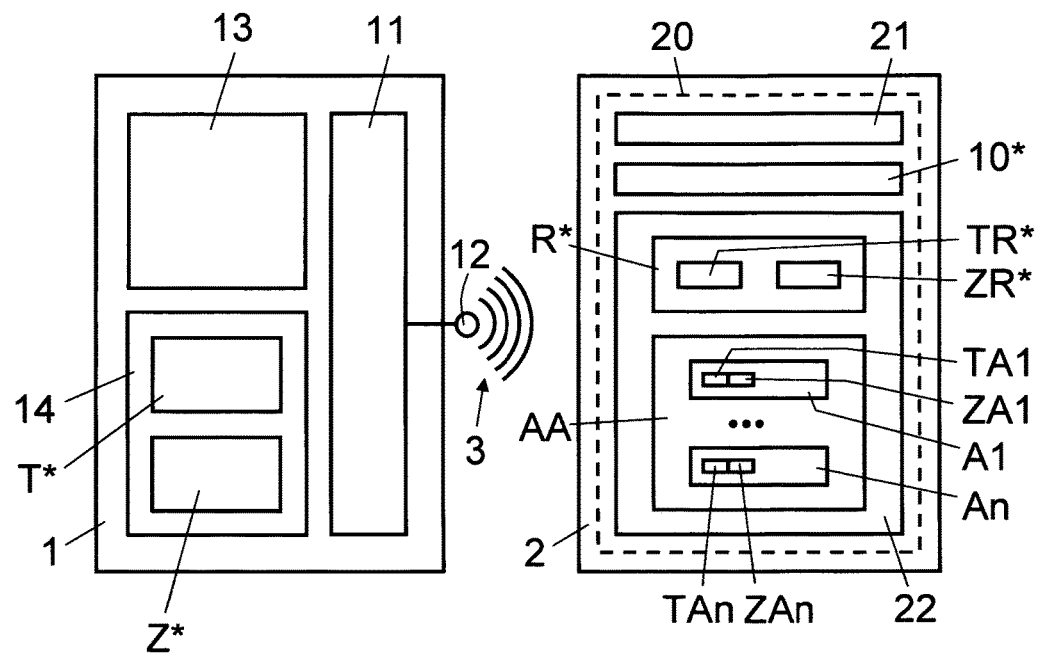
FIG. 8: shows a block diagram illustrating schematically a read/write device exchanging data via an electromagnetic field with a transponder module.
Figure 9:
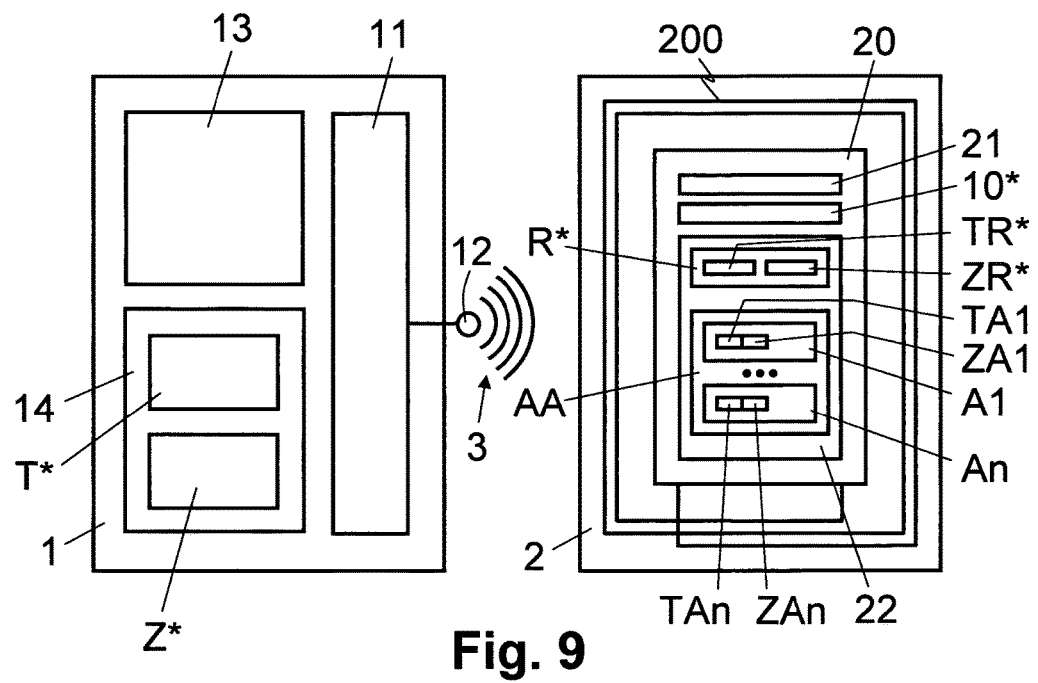
FIG. 9: shows a block diagram illustrating schematically the read/write device exchanging data via an electromagnetic field with a transponder module implemented as an RFID transponder.
Figure 10:
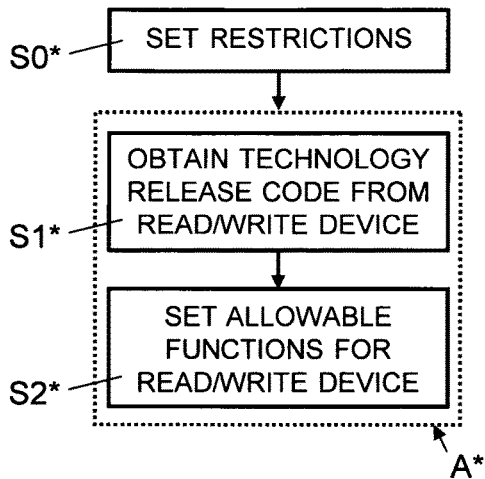
FIG. 10: shows a flow diagram illustrating an exemplary sequence of steps for setting in the transponder module access rights for the read/write device using a technology release code obtained from the read/write device.
Figure 11:
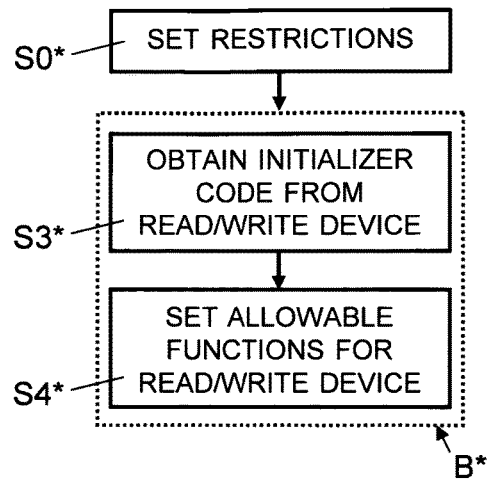
FIG. 11: shows a flow diagram illustrating an exemplary sequence of steps for setting in the transponder module access rights for the read/write device using an initializer code obtained from the read/write device.
Figure 12:
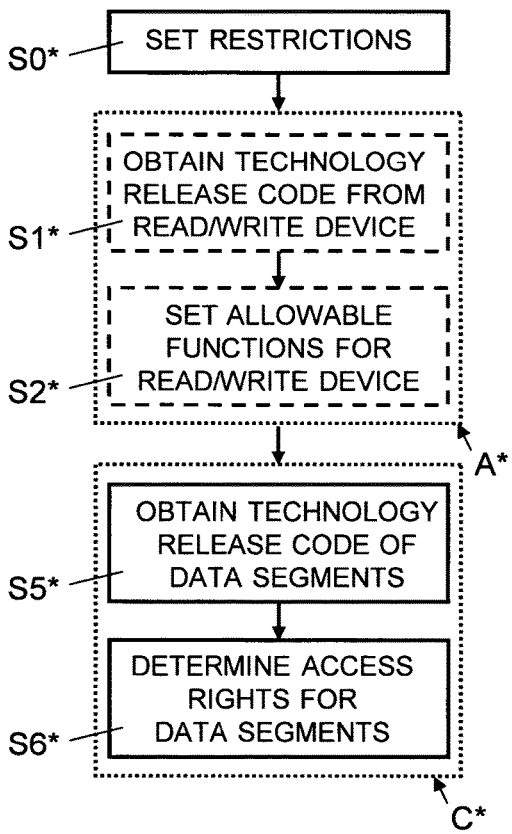
FIG. 12: shows a flow diagram illustrating an exemplary sequence of steps for determining in the transponder module access rights for data segments of the transponder module using a technology release code obtained from the read/write device.
Figure 13:
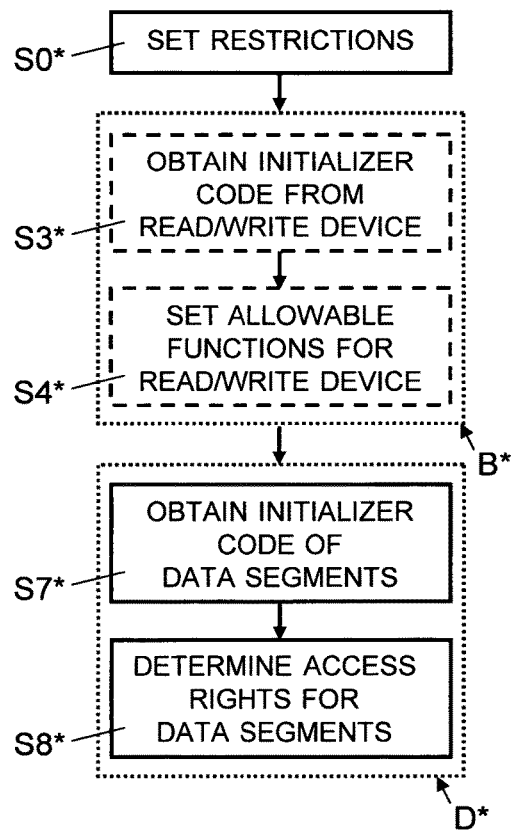
FIG. 13: shows a flow diagram illustrating an exemplary sequence of steps for setting in the transponder module access rights for data segments of the transponder module using an initializer code obtained from the read/write device.

In a further aspect of the invention, implemented as an addition or alternative, as illustrated in FIGS. 8 and 9, the read/write device 1 comprises a data store 14 which has stored therein at least one technology release code T* which indicates a version of technology of the read/write device 1. The technology release code T* of the read/write device 1 is an alphanumerical or binary code which indicates and identifies a particular version of technology of the read/write device 1. Specifically, the technology release code T* of the read/write device 1 indicates and identifies a particular technology release having specific characteristics such as the actual type of the processor or chip implemented on the read/write device 1, the actual version number of the processor or chip of the read/write device 1, the release or version number of the encryption algorithm implemented on the read/write device 1, and/or the release or version number of the communication protocol implemented on the read/write device 1 for exchanging data via the electromagnetic field 3 with the transponder module 2. In an embodiment, the type of the processor or chip implemented on the read/write device 1 includes the manufacturer of the chip. In a further embodiment, the technology release code T* of the read/write device 1 indicates the technology release code(s) T of one or more transponder modules 2 which have been used to store access rights on the read/write device 1. In another embodiment, the data store 14 of the read/write device 1 has stored therein an initializer code Z*, as described above in the context of the transponder module 2, which indicates and identifies the initializing entity, e.g. a manufacturing or service provider firm, which actually initialized the read/write device 1 by storing the technology release code in the read/write device 1. Depending on the embodiment, the technology release code T* and/or the initializer code Z* of the read/write device 1 is/are stored in encrypted or non-encrypted form in the data store 14 of the read/write device 1.

The technology release code T* of the read/write device 1 is obtainable for the transponder module 2 via the electromagnetic field 3 for setting in the transponder module 2 access rights for the read/write device 1 (access rights as described above in the context of the transponder module 2) using the technology release code T* of the read/write device 1. As illustrated in FIGS. 8 and 9, for that purpose, the transponder module 2 comprises a security module 10* configured to obtain from the read/write device 1 via the electromagnetic field 3 a technology release code T* which indicates a version of technology of the read/write device 1, and to set access rights for the read/write device 1 using the technology release code T* of the read/write device 1. This makes possible a method of controlling access rights between the transponder module 2 and the read/write device 1 by the transponder module 2 obtaining via the electromagnetic field 3 from the read/write device 1 the technology release code T* of the read/write device 1, which indicates a version of technology of the read/write device 1, and by the transponder module 2 setting access rights for the read/write device 1 using the technology release code T* of the read/write device.

Accordingly, in the further aspect of the invention, the transponder module 2 comprises restrictions R* stored in a data store 22. As described above for the read/write device 1, the restrictions R* are stored in a black list, which includes restricted technology release codes TR* and/or restricted initializer codes ZR* that identify a specific banned or blocked technology release or initializer, respectively, for which any rights of performing any functions or accessing data have been disallowed or cancelled and are, thus, prohibited. Accordingly, the restrictions R* indicate one or more blocked or banned technology release or initializer of a read/write device 1.

With reference to FIGS. 10, 11, 12, 13, and 14, described in the following paragraphs are possible sequences of steps performed by the read/write device 1 and the transponder module 2, respectively, to control authorization of access rights between the read/write device 1 and the transponder module 2 according to the further aspect of the invention, based on the technology release code T* and/or the initializer code Z* of the read/write device 1.

According to the further aspect of the invention, in step S0*, restrictions are set in the transponder module 2. Specifically, for each technology release and/or initializer of a read/write device 1 which is to be banned, blocked or black-listed, the respective technology release code TR* and/or initializer code ZR* is stored by an authorized entity as a restriction R* in the data store 22 of the transponder module 2.

According to the further aspect of the invention, in steps S1* or S3*, the security module 10* of the transponder module 2 obtains the technology release T* or initializer code Z*, respectively, via the electromagnetic field 3 from the read/write device 1. Essentially, the technology release code T* or initializer code Z* is determined as described above but with reversed "roles" of transponder module 2 and read/write device 1, as applicable.

According to the further aspect of the invention, in step S2* or S4*, respectively, the security module 10* of the transponder module 2 determines and sets access rights for the read/write device 1, depending on the technology release code T* or initializer code Z* obtained from the read/write device 1. Specifically, the security module 10* checks in the data store 22 of the transponder module 2 whether the obtained technology release T* or initializer code Z* corresponds to a banned or blocked technology release TR* or initializer ZR*. If there is a match and the read/write device 1 is considered banned or blocked, no further data exchange with the transponder module 2 is allowed, i.e. no functions and further interactions with the transponder module 2 are allowed for the read/write device 1. In a variant, the allowed functions or interactions are limited to a defined subset for the read/write device 1. For example, the security module 10* determines and sets the access rights for the read/write device 1 depending on the type of the chip implemented on the read/write device 1, the version number of the chip of the read/write device 1, the release or version number of the encryption algorithm implemented on the read/write device 1, and/or the version number of the communication protocol implemented on the read/write device 1 for exchanging data via the electromagnetic field 3 with transponder module 2, as defined by the technology release code T* obtained from the read/write device 1.

According to the further aspect of the invention, the security module 10* of the transponder module 2 executes steps S5* or S7*, respectively, if the read/write device 1 was not determined to be banned or blocked or if the steps of block A* and/or block B* are skipped as optional steps. In step S5* or S7*, respectively, the security module 10* of the transponder module 2 reads from the application area AA of the transponder module 2 the technology release codes TA1, . . . , TAn and/or initializer codes ZA1, . . . , ZAn included in the application specific data segments A1, . . . , An.

Moreover, according to the further aspect of the invention, in step S6* or S8*, respectively, the security module 10* of the transponder module 2 determines and sets access rights for the read/write device 1, depending on the technology release code T* or initializer code Z* obtained from the read/write device 1 and the technology release code TA1, . . . , TAn and/or initializer codes ZA1, . . . , ZAn included in the respective application specific data segment A1, . . . , An of the transponder module 2. Therefore, it is possible for the security module 10* of the transponder module 2 to restrict access rights for application specific data segments A1, . . . , An on an individual basis, depending on whether the entity that generated and/or updated the respective application-specific data segment A1, . . . , An used a banned or blocked technology release corresponding to a restricted technology release code TR* or was initialized by a banned or blocked initializer corresponding to a restricted initializer code ZR*. For example, the security module 10* of the transponder module 2 cancels or prohibits read and/or write access to any application-specific data segment A1, . . . , An that includes a technology release code TA1, . . . , TAn corresponding to a restricted technology release code TR* or an initializer code ZA1, . . . , ZAn corresponding to a restricted initializer code ZR*.

By comparing the technology release code T* and/or the initializer code Z* of the read/write device 1 to the technology release codes TA1, . . . , TAn and/or the initializer codes ZA1, . . . , ZAn included in the application specific data segments A1, . . . , An of the transponder module 2, it is possible to block for the read/write device 1 some application-specific data segments A1, . . . , An on a particular transponder module 2 while keeping other application-specific data segments A1, . . . , An unblocked and fully accessible. Thus, depending on the access rights implemented, application-specific data segments A1, . . . , An generated under one or more specific branches and/or levels of a hierarchical authentication scheme are blocked completely and/or limited to read only access, write only access, read once access, write once access, conditional access, and/or segmented access, as outlined above.

Figure 14:
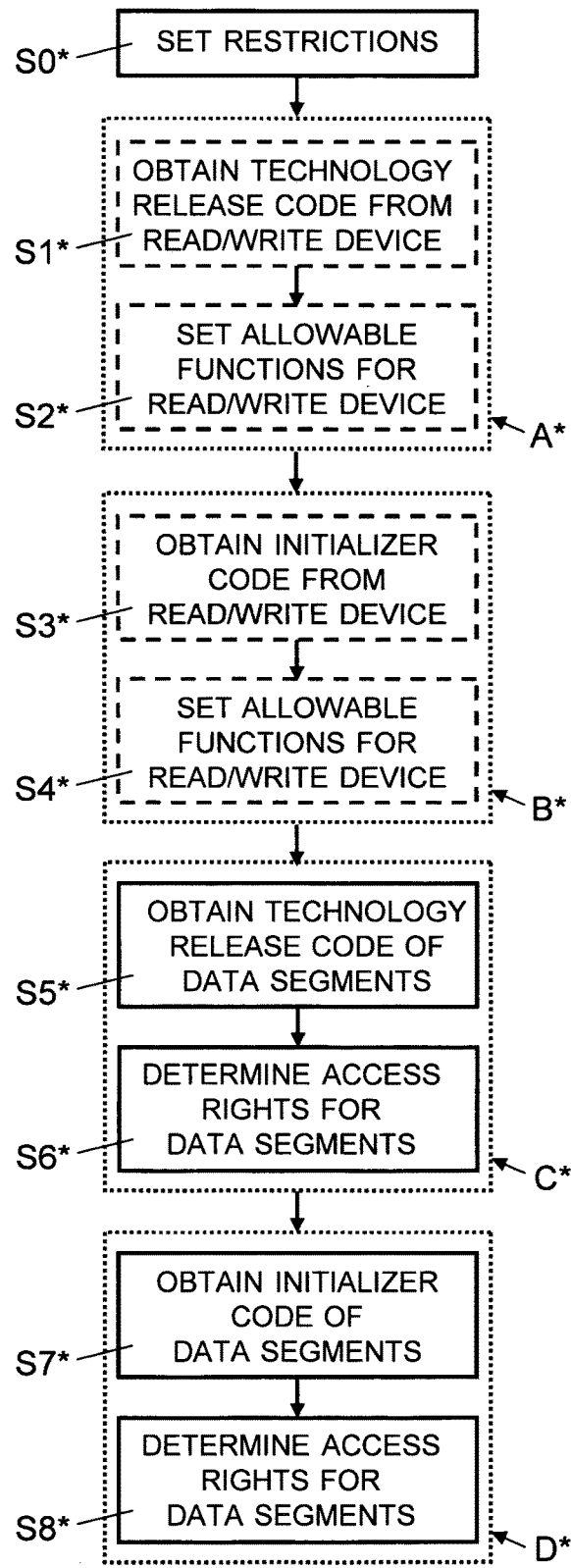
FIG. 14: shows a flow diagram illustrating an exemplary sequence of steps for setting in the transponder module access rights for data segments of the transponder module using a technology release code and an initializer code obtained from the read/write device.

As illustrated in FIG. 14, in various embodiments, block C*, including steps S5* and S6*, is executed in combination with block D*, including steps S7* and S8*, subsequently to executing block A*, including steps S1* and S2*, and/or block B*, including steps S3* and S4*, e.g. if the read/write device 1 was not determined to be banned or blocked, or block A* and/or block B* are skipped as optional steps.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. A read/write device for exchanging data via an electromagnetic field with a transponder module, the read/write device being configured to:
   obtain from the transponder module via the electromagnetic field a technology release code which indicates a version of technology of the transponder module, and to use the technology release code as an index for looking up in a table, list, or database specific characteristics of the technology release code and/or to use one or more code segments of the technology release code for determining specific characteristics of the technology release version and to set access rights for the transponder module using the specific characteristics of the technology release code to block selectively the transponder module depending on the specific characteristics of the technology release version,
   wherein the technology release code indicates at least one of: a type of a chip of the transponder module, a version number of the chip of the transponder module, a release number of an encryption algorithm implemented on the transponder module, and a version number of a communication protocol implemented on the transponder module for exchanging data via the electromagnetic field with the read/write device.

2. The read/write device of claim 1, wherein the read/write device is further configured to exchange with the transponder module mutual authentication messages, to determine identification information associated with the transponder module using at least one of the mutual authentication messages received from the transponder module, and to obtain the technology release code from the identification information associated with the transponder module.

3. The read/write device of claim 1, wherein the read/write device is further configured to generate and transmit to the transponder module a read request, to receive from the transponder module a read response, to determine unencrypted identification information associated with the transponder module using encrypted or non-encrypted identification information included in the read response, and to obtain the technology release code from the unencrypted identification information associated with the transponder module.

4. The read/write device of claim 1, wherein the read/write device is further configured to obtain from the transponder module via the electromagnetic field a technology release code included in an application specific data segment stored on the transponder module, and to determine access rights for the application specific data segment using the technology release code included in the application specific data segment.

5. The read/write device of claim 1, wherein the read/write device is further configured to obtain from the transponder module via the electromagnetic field an initializer code which indicates an initializing entity, which initializing entity initialized the transponder module by storing identification information in the transponder module, and to set access rights for the transponder module using the initializer code.

6. The read/write device of claim 1, wherein the read/write device is further configured to obtain from the transponder module via the electromagnetic field an initializer code included in an application specific data segment stored on the transponder module, and to determine access rights for the application specific data segment using the initializer code included in the application specific data segment.

7. A method of controlling access rights between a read/write device and a transponder module configured to exchange data via an electromagnetic field, the method comprising:
obtaining by the read/write device via the electromagnetic field from the transponder module a technology release code which indicates a version of technology of the transponder module, using the technology release code as an index for looking UP in a table, list, or database specific characteristics of the technology release code and/or using one or more code segments of the technology release code for determining specific characteristics of the technology release version, and
setting by the read/write device access rights for the transponder module based on the specific characteristics of the technology release code to block selectively the transponder module depending on the specific characteristics of the version of the technology,
wherein the technology release code indicates at least one of: a type of a chip of the transponder module, a version number of the chip of the transponder module, a release number of an encryption algorithm implemented on the transponder module, and a version number of a communication protocol implemented on the transponder module for exchanging data via the electromagnetic field with the read/write device.

8. The method of claim 7, wherein the method further comprises exchanging between the read/write device and the transponder module mutual authentication messages, determining by the read/write device identification information associated with the transponder module using at least one of the mutual authentication messages received from the transponder module, and obtaining by the read/write device the technology release code from the identification information associated with the transponder module.

9. The method of claim 7, wherein the method further comprises transmitting from the read/write device to the transponder module a read request, receiving in the read/write device from the transponder module a read response, determining by the read/write device unencrypted identification information associated with the transponder module using encrypted or non-encrypted identification information included in the read response, and obtaining by the read/write device the technology release code from the unencrypted identification information associated with the transponder module.

10. The method of claim 7, wherein the method further comprises obtaining by the read/write device via the electromagnetic field from the transponder module a technology release code included in an application specific data segment stored on the transponder module, and determining by the read/write device access rights for the application specific data segment using the technology release code included in the application specific data segment.

11. The method of claim 7, wherein the method further comprises obtaining by the read/write device via the electromagnetic field from the transponder module an initializer code, which initializer code indicates an initializing entity, which initializing entity initialized the transponder module by storing identification information in the transponder module, and setting by the read/write device access rights for the transponder module using the initializer code.

12. The method of claim 7, wherein the method further comprises obtaining by the read/write device via the electromagnetic field from the transponder module an initializer code included in an application specific data segment stored on the transponder module, and determining by the read/write device access rights for the application specific data segment using the initializer code included in the application specific data segment.

13. A transponder module for exchanging data via an electromagnetic field with a read/write device, the transponder module comprising:
a data storage device having stored therein a technology release code which indicates a version of technology of the transponder module, the transponder module being configured to make the technology release code available to the read/write device via the electromagnetic field, the read/write device being configured to use the technology release code as an index for looking UP in a table, list, or database specific characteristics of the technology release code and/or to use one or more code segments of the technology release code for determining specific characteristics of the technology release version, and to set in the read/write device access rights for the transponder module using the specific characteristics of the technology release code to block selectively the transponder module depending on the specific characteristics of the version of the technology,
wherein the technology release code indicates at least one of: a type of a chip of the transponder module, a version number of the chip of the transponder module, a release number of an encryption algorithm implemented on the transponder module, and a version number of a communication protocol implemented on the transponder module for exchanging data via the electromagnetic field with the read/write device.

14. The transponder module of claim 13, wherein the data storage device has further stored therein an initializer code which indicates an initializing entity, which initializing entity initialized the transponder module, the initializer code being obtainable for the read/write device via the electromagnetic field for setting in the read/write device access rights for the transponder module using the initializer code.

15. The transponder module of claim 13, wherein the data storage device further has stored therein one or more application specific data segment, each of the application specific data segment including identification information with at least one of: a technology release code and an initializer code, the technology release code and the initializer code being obtainable for the read/write device via the electromagnetic field for setting in the read/write device access rights for accessing an application specific data segment of the transponder module.

16. A transponder module for exchanging data via an electromagnetic field with a read/write device, the transponder module being:
configured to obtain from the read/write device via the electromagnetic field a technology release code which indicates a version of technology of the read/write device, and to use the technology release code as an index for looking UP in a table, list, or database specific characteristics of the technology release code and/or to use one or more code segments of the technology release code for determining specific characteristics of the technology release version, and to set access rights for the read/write device using the specific characteristics of the technology release code of the read/write device to block selectively the read/write device depending on the specific characteristics of the version of technology, wherein the technology release code indicates at least one of: a type of a chip of the read/write device, a version number of the chip of the read/write device, a release number of an encryption algorithm implemented on the read/write device, and a version number of a communication protocol implemented on the read/write device for exchanging data via the electromagnetic field with the transponder module.

17. The transponder module of claim 16, wherein the transponder module is further configured to exchange with the read/write device mutual authentication messages, and to determine the technology release code of the read/write device using at least one of the mutual authentication messages received from the read/write device.

18. The transponder module of claim 17, wherein the transponder module is further configured to generate and transmit to the read/write device a read request, to receive from the read/write device a read response, and to determine the technology release code of the read/write device from the read response.

19. The transponder module of claim 16, wherein the transponder module is further configured to determine a technology release code included in an application specific data segment stored on the transponder module, and to determine access rights for the application specific data segment using the technology release code included in the application specific data segment.

20. The transponder module of claim 16, wherein the transponder module is further configured to obtain from the read/write device via the electromagnetic field an initializer code which indicates an initializing entity, which initializing entity initialized the read/write device, and to set access rights for the read/write device using the initializer code.

21. The transponder module of claim 16, wherein the transponder module is further configured to obtain from the transponder module an initializer code included in an application specific data segment stored on the transponder module, and to determine access rights for the application specific data segment using the initializer code included in the application specific data segment.

22. A method of controlling access rights between a read/write device and a transponder module configured to exchange data via an electromagnetic field, the method comprising:

obtaining by the transponder module via the electromagnetic field from the read/write device a technology release code which indicates a version of technology of the read/write device, using the technology release code as an index for looking UP in a table, list, or database specific characteristics of the technology release code and/or using one or more code segments of the technology release code for determining specific characteristics of the technology release version, and setting by the transponder module access rights for the read/write device using the specific characteristics of the technology release code of the read/write device to block selectively the read/write device based on the specific characteristics of the version of technology, wherein the technology release code indicates at least one of: a type of a chip of the read/write device, a version number of the chip of the read/write device, a release number of an encryption algorithm implemented on the read/write device, and a version number of a communication protocol implemented on the read/write device for exchanging data via the electromagnetic field with the transponder module.

23. The method of claim 22, wherein the method further comprises exchanging between the read/write device and the transponder module mutual authentication messages, and determining by the transponder module the technology release code of the read/write device using at least one of the mutual authentication messages received from read/write device.

24. The method of claim 22, wherein the method further comprises transmitting from the transponder module to the read/write device a read request, receiving in the transponder module from the read/write device a read response, and determining by the transponder module the technology release code of the read/write device from the read response.

25. The method of claim 22, wherein the method further comprises obtaining by the transponder module a technology release code included in an application specific data segment stored on the transponder module, and determining by the transponder module access rights for the application specific data segment using the technology release code included in the application specific data segment.

26. The method of claim 22, wherein the method further comprises obtaining by the transponder module via the electromagnetic field from the read/write device an initializer code, which initializer code indicates an initializing entity, which initializing entity initialized the read/write device, and setting by the transponder module access rights for the read/write device using the initializer code.

27. The method of claim 22, wherein the method further comprises obtaining by the transponder module an initializer code included in an application specific data segment stored on the transponder module, and determining by the transponder module access rights for the application specific data segment using the initializer code included in the application specific data segment.

\* \* \* \* \*